(12) United States Patent
Jibry

(10) Patent No.: US 8,437,234 B1
(45) Date of Patent: May 7, 2013

(54) DYNAMIC PHASE DETECTOR SWITCHING

(75) Inventor: Rafel Jibry, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/456,049

(22) Filed: Apr. 25, 2012

(51) Int. Cl.
*G11B 5/09* (2006.01)
(52) U.S. Cl.
USPC .............. 369/59.12; 369/59.2; 369/59.22; 369/47.28
(58) Field of Classification Search .................. None
See application file for complete search history.

(56) References Cited

U.S. PATENT DOCUMENTS

| | | | |
|---|---|---|---|
| 6,356,149 B1 * | 3/2002 | Stengel et al. | 330/107 |
| 7,149,914 B1 * | 12/2006 | Asaduzzaman et al. | 713/500 |
| 7,433,142 B2 | 10/2008 | Bui et al. | |
| 7,440,208 B1 | 10/2008 | McEwen et al. | |
| 7,555,667 B1 * | 6/2009 | Burney et al. | 713/401 |
| 8,095,712 B2 | 1/2012 | Howarth et al. | |
| 2009/0019101 A1 | 1/2009 | Skaug | |
| 2011/0032630 A1 | 2/2011 | Lee et al. | |

* cited by examiner

*Primary Examiner* — Muhammad N Edun

(57) ABSTRACT

A signal processing device with dynamic phase detector switching includes a first phase detector of a first type, a second phase detector of a second type, and a mixing device to switch between using output from the first phase detector and output from the second phase detector in real time based on specified changes in an input signal being fed to the signal processing device.

15 Claims, 5 Drawing Sheets

DYNAMIC PHASE DETECTOR SWITCHING

BACKGROUND

As the use of digital data increases, the capacity of data storage devices to hold this data and the corresponding methods for achieving higher capacity are improving. For example, methods for writing to tape backup drives are such that more bits are being fit within a smaller volume of magnetic tape. When using such methods, the magnetic characteristics that indicate the value of a particular bit are spread across multiple bit spaces in the read back signal. Thus, to read the value of a particular bit from a particular bit space, a reading device has to take into account the magnetic characteristics of neighboring bit spaces. This overlap of bit encoding results in Inter-Symbol Interference (ISI) within the read back signal. Partial Response Maximum Likelihood (PRML) techniques may be used to decode the individual bits encoded using such techniques.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

Figure 1A:
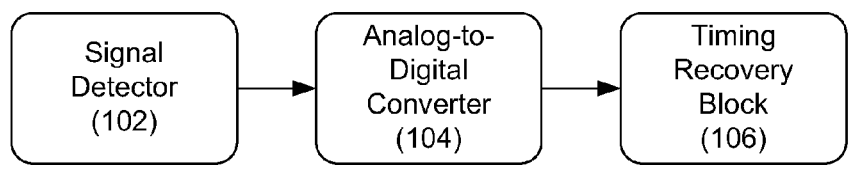
FIG. 1A is a diagram showing an illustrative signal processing device, according to one example of principles described herein.

During a reading process of a magnetic tape, a sensor detects the magnetic flux direction as the magnetic tape passes by. The sensor creates an electrical signal of a particular frequency and phase. The electrical signal is modulated by the magnetic flux detected by the sensor. This signal passes through a Phase Locked Loop (PLL) to keep the phase of the reading device locked appropriately to allow processing of the corresponding digital signal. A PLL includes a phase detector, which measures the phase error of the incoming signal.

Different orders of phase detectors may be used in the PLLs of reading devices for data signals. A higher order phase detector is used when the ISI of the input signal is greater. Alternatively, a lower order phase detector is typically used when there is a smaller ISI in the input signal. These different types of phase detectors have different benefits and drawbacks and thus the designer of the reading system balances these tradeoffs for the design purposes.

A lower order phase detector may be used when there is less ISI in the input signal. One example of a lower order phase detector is a PR4 phase detector. PR4 is a type of Partial Response Maximum Likelihood (PRML) method. PR4 exhibits a faster loop but has a lower channel Signal to Noise Ration (SNR) when the ISI is greater.

A higher order phase detector may be used when the ISI of the input signal is greater. One example of a higher order phase detector is an Extended Partial Response 4 (EPR4) phase detector. EPR4 phase detectors exhibit a slower loop bandwidth but have a higher SNR when the ISI is great.

These different types of phase detectors have different benefits and drawbacks for different situations. For example, the data written to a tape medium includes an acquisition field and a data field. The acquisition field causes the sensor reading the magnetic tape to produce an acquisition signal. The acquisition signal is a strong and obvious signal such as a clean sinusoidal signal that makes it easier for the PLL to lock onto the frequency and phase of that signal. The data field contains the data that is intended to be stored. The data signal resulting from sensing the data field is a heavily modulated signal with data encoded. Lower order phase detectors such as PR4 phase detectors are more effective when processing the acquisition signal, but weaker in performance when processing the data signal with greater ISI. Conversely, a higher order phase detector such as an EPR4 detector exhibits stronger performance when processing the data signal and a weaker performance when processing the acquisition signal.

In light of this and other issues, the present specification discloses methods and systems for dynamically switching between different phase detectors in real time while processing an input signal from a reading device. According to certain illustrative examples, a mixing device is used to switch between at least two different types of phase detectors in real time. The switch from one type of phase detector to another type of phase detector is based on characteristics of the input signal being fed to the signal processing device.

For example, during processing of a data signal, the mixing device may switch to use of a higher order PRML phase detector. During processing of an acquisition signal, the mixing device may switch to use of a lower order PRML phase detector. As will be described in more detail below, the mixing device may use information from phase detectors that detect phase information from other data channels besides the channel currently being processed.

Through use of methods and systems embodying principles described herein, a more effective and efficient manner of processing data signals is realized. This allows data to be stored at a higher density at a lower cost. For example, data may be written to a magnetic tape at a high density while maintaining the ability to read that data from the tape reliably, at efficient rates while using devices that cost less to manufacture, own and operate.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Referring now to the figures, FIG. 1A is a diagram showing an illustrative signal processing device (100). According to certain illustrative examples, the signal processing device (100) includes a signal detector (102), an Analog-to-Digital Converter (ADC), and a timing recovery block (106). The signal processing device may be designed to process a variety of different types of signals. This specification will use an example of a signal read from a magnetic tape drive.

The signal detector (102) is a sensor that creates an electrical signal based on the sensed information. For example, as the magnetic tape passes by a reading device, the magnetic flux from that tape that represents encoded data will cause the reader to produce an electric signal. Within this signal is the encoded data that was written to the tape drive.

This signal is typically in an analog form. An analog signal is one that takes on a continuum of values. In contrast, a digital signal is one that takes on a discrete set of values or measurements at discrete time intervals. The ADC (104) converts the analog signal received by the signal detector into a digital signal.

The timing recovery block (106) is used to reconstruct digital samples at times or phases corresponding to bit times or phases such that the data from the signal can be read accurately. Without the timing recovery block, the signal processing device would not be taking signal measurements at the time intervals that correspond to bits encoded within the data stream.

Figure 1B:
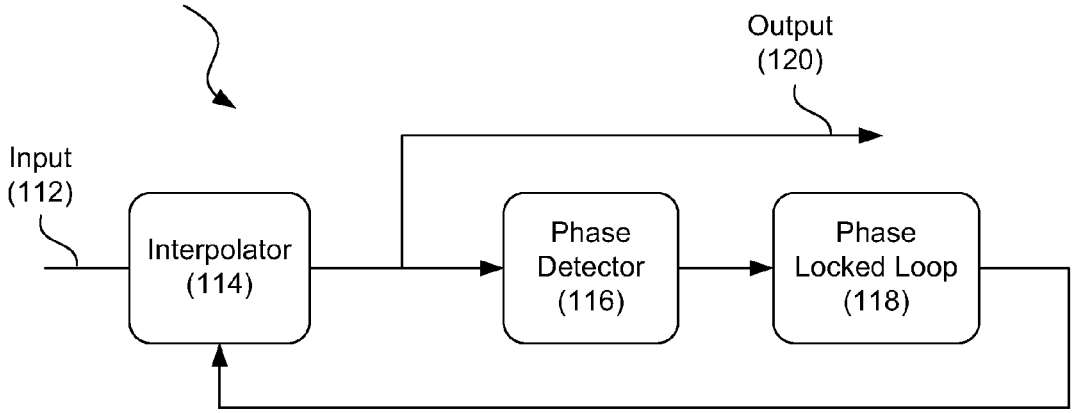
FIG. 1B is a diagram showing an illustrative timing recovery block, according to one example of principles described herein.

FIG. 1B is a diagram showing an illustrative timing recovery block (110). According to certain illustrative examples, the timing recovery block includes an interpolator (114), a phase detector (116) and a PLL (118). The timing recovery block ensures that the phase of the output signal (120) matches the phase of the data in the input signal (112).

The interpolator (114) is used to create a new set of discrete data points from an existing set of data points. For example, the ADC may be designed to sample data at a particular rate. The interpolator uses various functions to make a relatively accurate estimate of the signal value in between sampled points to create the new set of points.

A phase detector (116) determines the phase error in the output signal. This phase error is used by the PLL (118) to feed information back to the interpolator. Specifically, the phase detector (116) detects the error in phase of the output signal (120). The PLL (118) uses this information to adjust the interpolator (114) so that the phase of the output signal (120) is adjusted to approach or match the ideal phase.

As mentioned above, different types of phase detectors may be used. A lower order phase detector may be used when there is a smaller ISI in the input signal. One example of a lower order phase detector is a PR4 phase detector. PR4 is a type of Partial Response Maximum Likelihood (PRML) method. PR4 exhibits a faster loop but has a lower channel Signal to Noise Ration (SNR) when the ISI is greater. A higher order phase detector may be used when the ISI of the input signal is greater. One example of a higher order phase detector is an Extended Partial Response 4 (EPR4) phase detector. EPR4 phase detectors exhibit a slower loop bandwidth but allow for a higher SNR implementation or lower cost implementation when the ISI is large.

Figure 2:
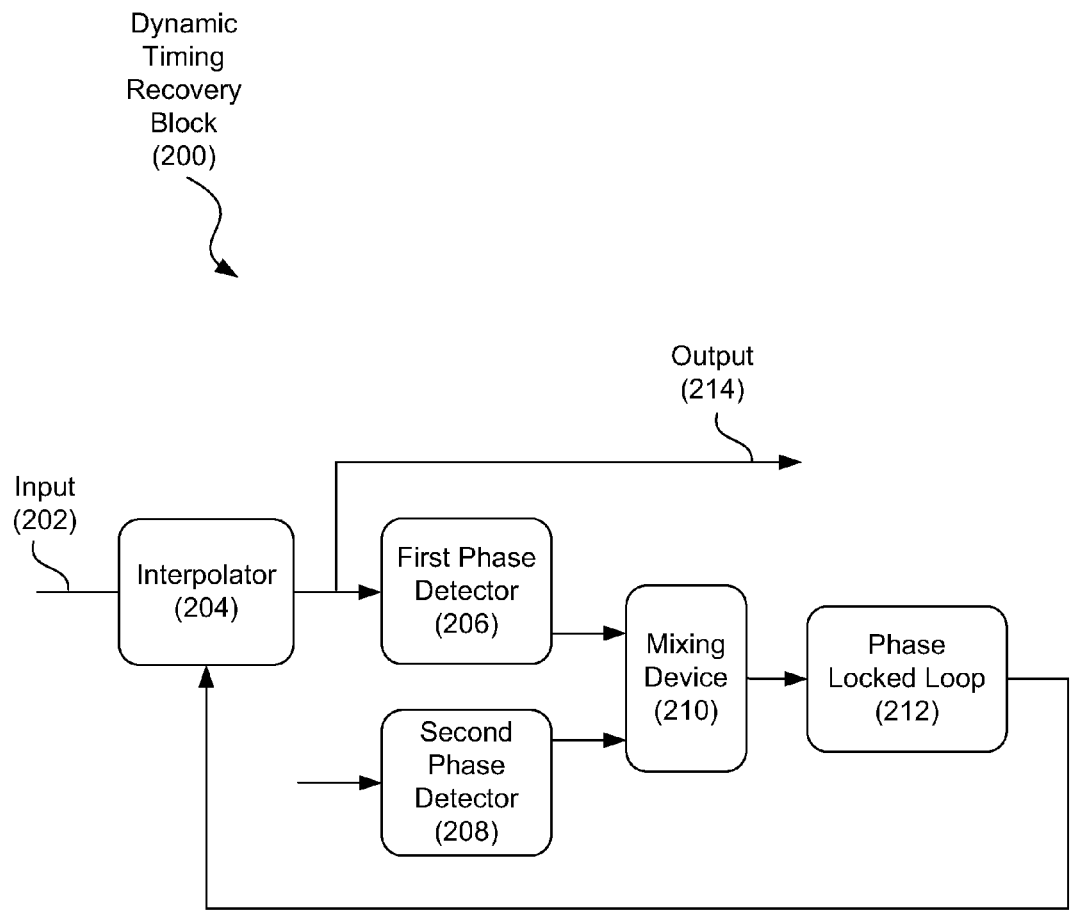
FIG. 2 is a diagram showing an illustrative dynamic timing recovery block, according to one example of principles described herein.

FIG. 2 is a diagram showing an illustrative dynamic switching timing recovery block (200). According to certain illustrative examples, the dynamic switching timing recovery block (200) includes an interpolator (204), a first phase detector (206), a second phase detector (208), a mixing device (210), and a PLL (212). The dynamic switching timing recovery block (200) is also used to keep the phase of the output signal (214) near that of the ideal phase. While two phase detectors are shown, more than two phase detectors may feed information to the PLL (212).

The dynamic switching timing recovery block (200) uses a mixing device to use information from multiple phase detectors (206, 208) to feed the PLL (212). The mixing device (210) may use information from one of the available phase detectors or information from multiple phase detectors simultaneously. Moreover, the mixing device (210) may change how it uses information from multiple phase detectors in real time. Such changes may be in response to various conditions.

For example, it may be the case that the first phase detector (206) is a lower order phase detector such as a PR4 phase detector. It may also be the case that the second phase detector (208) is a higher order phase detector such as an EPR4 phase detector. As mentioned above, these different types of phase detectors have different benefits and drawbacks for different situations.

For example, the data written to a tape medium includes an acquisition field and a data field. The acquisition field causes the sensor reading the magnetic tape to produce an acquisition signal. The acquisition is a strong signal that makes it easier for the PLL to lock onto the frequency and phase of that signal. The data field is where the data that is intended to be stored to the magnetic tape is written. The data signal resulting from sensing the data field is a heavily modulated signal with data encoded. Lower order phase detectors such as PR4 phase detectors are more effective when processing the acquisition signal, but weaker in performance when processing the data signal in the presence of greater ISI. Conversely, a higher order phase detector such as an EPR4 detector exhibits stronger performance when processing the data signal in the presence of greater ISI and a weaker performance when processing the acquisition signal.

According to certain illustrative examples, the mixing device (210) is set to use the first phase detector (206), which is a lower order phase detector, while the input signal (202) is an acquisition signal. Additionally, the mixing device (210) is set to use the second phase detector (208), which is a higher order phase detector, while the input signal (202) is a data signal. As the input signal switches between reading information from the acquisition field and the data field, the mixing device is set to switch between the two phase detectors in response.

The mixing device (210) can be set to switch between different phase detectors for varying reasons. For example, it may be the case that the first phase detector (206) receives information from a different channel than the channel feeding the second phase detector (208). In the example of tape drives, data may be written to multiple parallel strips. Additionally, parallel channels reading the multiple parallel strips may be nominally at the same frequency and phase. Thus, phase detector information from an adjacent channel may be useful for keeping the phase and frequency locked as appropriate.

In some cases, the second phase detector (208) may receive a signal from a different interpolator than the first phase detector (206). Specifically, in the case where the second phase detector is a higher order phase detector such as EPR4, then a second interpolator may be used. The second interpolator will also receive a feedback signal from the PLL (212). Having a separate interpolator for the second phase detector (208) allows for different equalization to be performed by the different interpolators. In some cases, a single interpolator may be used. That single interpolator, however, would have to be designed to equalize the signal differently for the different types of phase detectors. In the case where the second phase detector is from a separate channel, the second phase detector would naturally be receiving data from an interpolator of that separate channel.

Figure 3:
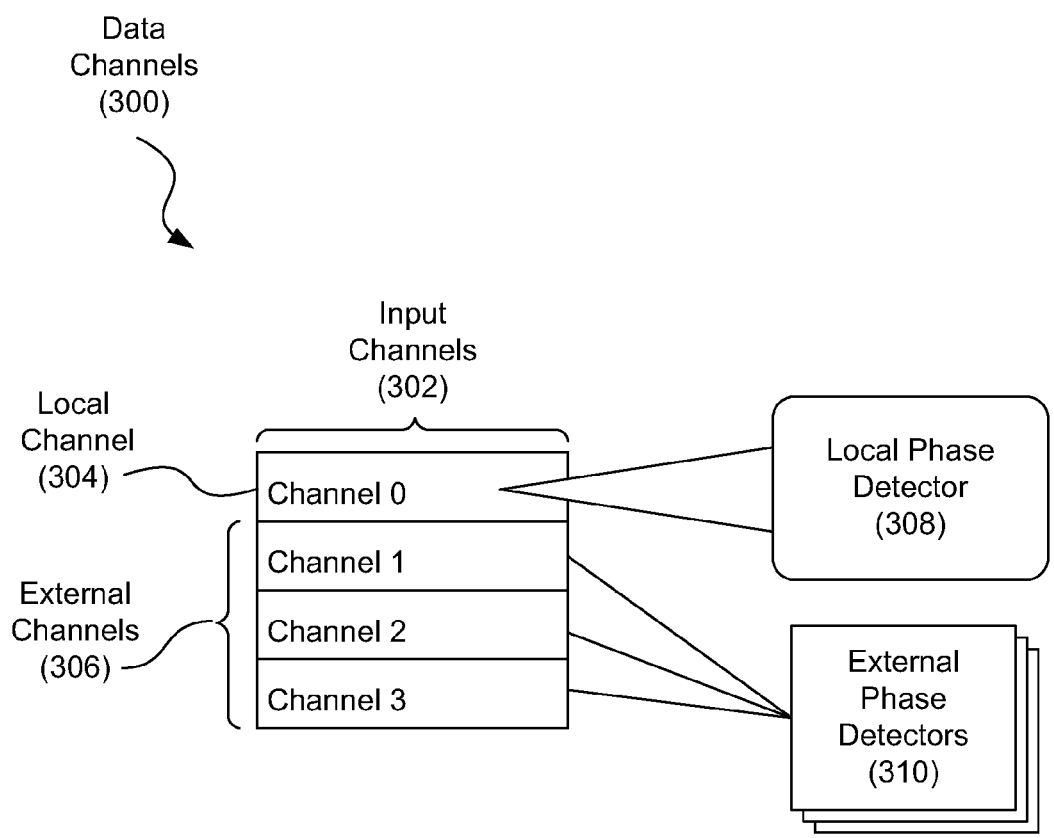
FIG. 3 is a diagram showing illustrative read channels, according to one example of principles described herein.

FIG. 3 is a diagram showing illustrative data channels (300). According to certain illustrative examples, a magnetic tape drive may have multiple parallel strips of data encoded.

Each of these strips constitutes a different data channel. When reading data from such a magnetic tape, a sensor is used for each data channel and each data channel is read simultaneously. Data is typically written on such magnetic tapes in a manner such that when reading the signal, the data frequencies and phases of multiple channels are relatively close or constant. Thus, information about one channel may be useful for the phase detector and PLL of an adjacent channel.

For illustrative purposes, a local channel (304) refers to a channel that is being read by a signal processing device for the referenced channel. Any channels that are not local channels are external channels. In the example of FIG. 3, there are four input channels (302) labeled 0-3. Channel 0, in this case is the local channel. Thus, channels 1-3 are external channels (306). A particular signal processing device is designed to process data from a particular channel, the local channel (304).

The mixing device (e.g. 210, FIG. 2) of that signal processing device can include information from external phase detectors (310) that measure the phase of the data from external channels (306). Using information from multiple channels can help the PLL keep a lock, through a wider variety of circumstances, on the frequency and phase of the data being processed through the local channel (304).

In some cases, the mixing device may utilize different weighting of information received from the local phase detector (308) and the external phase detector (310). This weighting may also change in real time based on measured metrics of the data from the local channel and external channels. For example, as the SNR of a particular channel changes, the mixing device may change how that particular channel's phase detector information is weighted. Specifically, if the SNR of a particular channel decreases, the mixing device may give less weight to that channel's phase detector information.

Figure 4:
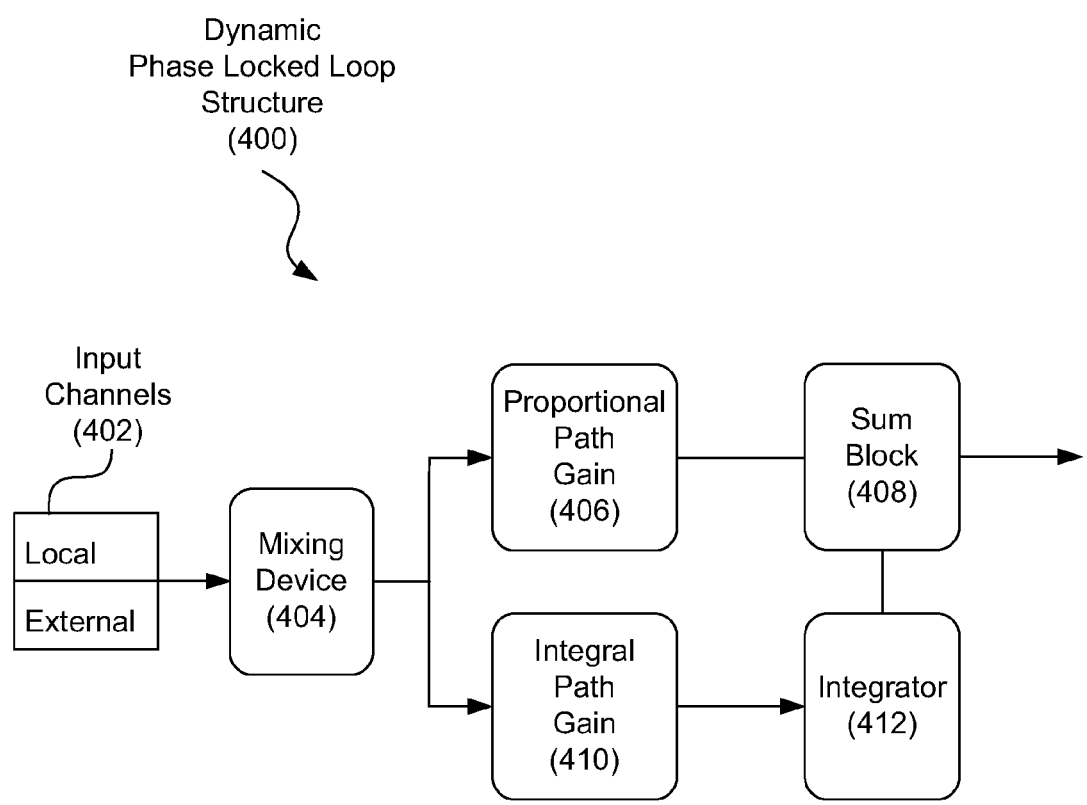
FIG. 4 is a diagram showing an illustrative dynamic phase locked loop structure, according to one example of principles described herein.

FIG. 4 is a diagram showing an illustrative dynamic phase locked loop structure (400). According to certain illustrative examples, the PLL structure includes a proportional path gain (406), an integral path gain (410), an integrator (412), and a sum block (408). A mixing device (404) is used to provide information from both local and external channels (402).

The proportional path gain (406) and the integral path gain (410) affect the feedback loop of the PLL. The proportional gain (406) produces an output that is proportional to the phase difference. The integral path gain (410) and integrator (412) are used to affect the output based on the magnitude and duration of the phase difference. These different components of the PLL may benefit from phase information from different sources differently. For example, the mixer device (404) may be designed to weight phase information from the local channel and the external channels differently.

In one example, the mixing device (404) may be set to use information from the local channel for the proportional path gain component (406). Moreover, the mixing device may be set to use information from a lower order phase detector from the local channel. Additionally, the mixing device may be set to use information from the external channels, whether that information is from a lower or higher order phase detector, for the integral path gain component (410). This weighting may also be varied in real time during the signal reading process.

Figure 5:
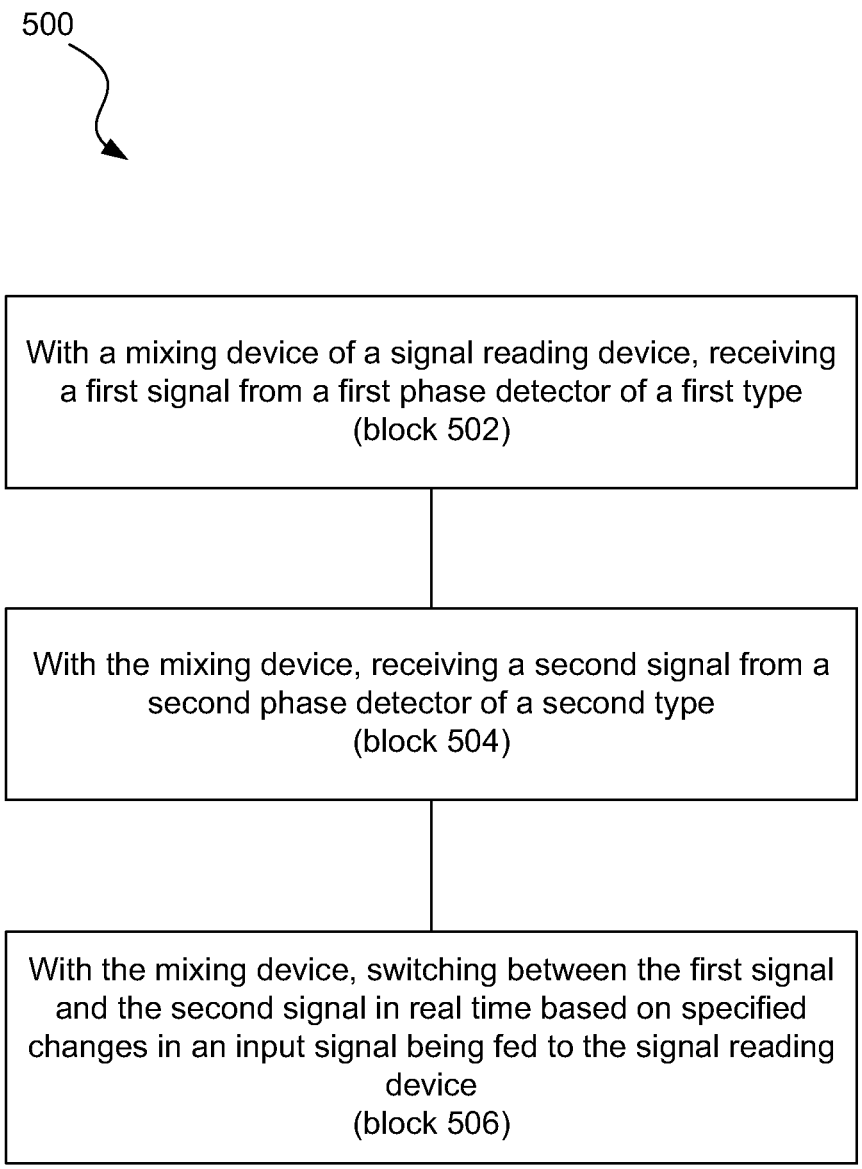
FIG. 5 is a flowchart showing an illustrative method for dynamic phase detector switching, according to one example of principles described herein.

FIG. 5 is a flowchart showing an illustrative method (500) for dynamic phase detector switching. According to certain illustrative examples, the method includes, with a mixing device of a signal processing device, receiving (block 502) a first signal from a first phase detector of a first type, with the mixing device, receiving (block 504) a second signal from a second phase detector of a second type, and with the mixing device, switching (block 506) between the first signal and the second signal in real time based on specified changes in an input signal being fed to the signal processing device.

In conclusion, through use of methods and systems embodying principles described herein, a more effective and efficient manner of processing data signals is realized. This allows data to be stored at higher densities with greater ISI. For example, data may be written to a magnetic tape in a highly compact manner while maintaining the ability to read that data from the tape reliably, at efficient speeds while using lower cost devices.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A signal processing device with dynamic phase detector switching, the device comprising:
   a first phase detector of a first type;
   a second phase detector of a second type; and
   a mixing device to switch between using output from said first phase detector and output from said second phase detector in real time based on specified changes in an input signal being fed to said signal processing device.

2. The device of claim 1, wherein said first phase detector is a lower order phase detector and said second phase detector is a higher order phase detector.

3. The device of claim 1, wherein said mixing device is to switch to said first phase detector when said input signal is an acquisition signal, and to said second phase detector when said input signal is a data signal.

4. The device of claim 1, wherein said mixing device is to switch to use information from both said first phase detector and said second phase detector.

5. The device of claim 4, wherein information from both of said phase detectors is weighted.

6. The device of claim 5, wherein said weighting varies in real time based on measured metrics of input signals put into said phase detectors.

7. The device of claim 4, wherein said first phase detector is to receive a local input signal from a local channel and said second phase detector is to receive an external input signal from an external channel.

8. The device of claim 1, wherein information from said phase detectors is used differently by at least one of: a proportional path and an integral path of a phase locked loop of said signal processing device.

9. A method for dynamic phase detector switching, the method comprising:
   with a mixing device of a signal processing device, receiving a first signal from a first phase detector of a first type;
   with said mixing device, receiving a second signal from a second phase detector of a second type; and
   with said mixing device, switching between said first signal and said second signal in real time based on specified changes in an input signal being fed to said signal processing device.

10. The method of claim 9, wherein said first phase detector is a lower order phase detector and said second phase detector is a higher order phase detector.

11. The method of claim 9, wherein said switching occurs in response to said input signal being read from one of: an acquisition field and a data field.

12. The method of claim 9, further comprising, with said mixing device, using information from both said first phase detector and said second phase detector.

13. The method of claim 12, wherein information from both of said phase detectors is affected by weighting that varies in real time based on measured metrics of said first signal and said second signal.

14. The method of claim 12, wherein said first signal is from a local channel and said signal is from an external channel.

15. A signal processing device with dynamic phase detector switching, the device comprising:
- a number of phase detectors, at least some of phase detectors being of a different type; and
- a mixing device to:
  - switch between using output from said phase detectors based on changes in an input signal being fed to said signal processing device and metrics; and
  - combine information from said phase detectors based on quality metrics measured from signals being fed into said phase detectors.

* * * * *